(12) United States Patent
Fujii et al.

(10) Patent No.: US 9,422,884 B2
(45) Date of Patent: Aug. 23, 2016

(54) INTERNAL COMBUSTION ENGINE CONTROL SYSTEM WITH INJECTOR VALVE TIMING CONTROL

(71) Applicant: Hitachi Automotive Systems, Ltd., Hitachinaka-shi, Ibaraki (JP)

(72) Inventors: Yoshihisa Fujii, Hitachinaka (JP); Takao Fukuda, Hitachinaka (JP); Masahiro Toyohara, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 245 days.

(21) Appl. No.: 14/367,029

(22) PCT Filed: Dec. 5, 2012

(86) PCT No.: PCT/JP2012/081442
§ 371 (c)(1),
(2) Date: Jun. 19, 2014

(87) PCT Pub. No.: WO2013/108498
PCT Pub. Date: Jul. 25, 2013

(65) Prior Publication Data
US 2014/0366848 A1  Dec. 18, 2014

(30) Foreign Application Priority Data
Jan. 16, 2012  (JP) .................. 2012-006453

(51) Int. Cl.
F02D 41/20  (2006.01)
F02D 41/24  (2006.01)
(Continued)

(52) U.S. Cl.
CPC ............. *F02D 41/20* (2013.01); *F02D 35/024* (2013.01); *F02D 41/247* (2013.01);
(Continued)

(58) Field of Classification Search
CPC ................. F02D 41/40–41/405; F02M 65/005
USPC ........... 701/105; 123/299, 435, 494; 361/139; 73/114.47, 114.49
See application file for complete search history.

(56) References Cited

U.S. PATENT DOCUMENTS 5,924,403 A * 7/1999 Thomas ................ F02D 41/345
                                                    123/300
6,164,264 A * 12/2000 Thomas ................ F02D 41/345
                                                    123/300
(Continued)

FOREIGN PATENT DOCUMENTS

JP  2001-280189 A  10/2001
JP  2003-065178 A   3/2003
(Continued)

OTHER PUBLICATIONS

PCT International Search Report on application PCT/JP2012/081442 mailed Mar. 19, 2013; 2 pages.

*Primary Examiner* — Hung Q Nguyen
*Assistant Examiner* — Robert Werner
(74) *Attorney, Agent, or Firm* — Foley & Lardner LLP

(57) ABSTRACT

The internal combustion engine control system includes an injector to supply fuel to an internal combustion engine, control section for calculating power distribution time for the injector, a sensor to detect a valve opening of the injector, and control section calculating and storing valve opening delay time, which is a difference between a power distribution start time and a valve opening detection time.
When a power distribution time determination section determines that the power distribution time for the injector is not less than a predetermined value, the valve opening delay time is calculated and stored. When the power distribution time for the injector is less than the predetermined value, the power distribution time for the injector is controlled based on the valve opening delay time stored in storing means to perform control to increase the injector power distribution time.

5 Claims, 5 Drawing Sheets

(51) Int. Cl.
*F02D 41/40* (2006.01)
*F02D 41/00* (2006.01)
*F02D 35/02* (2006.01)

(52) U.S. Cl.
CPC .......... *F02D 41/401* (2013.01); *F02D 41/402* (2013.01); *F02D 35/023* (2013.01); *F02D 41/008* (2013.01); *F02D 2041/2055* (2013.01); *F02D 2200/0602* (2013.01); *F02D 2200/0618* (2013.01); *Y02T 10/44* (2013.01)

(56) References Cited

U.S. PATENT DOCUMENTS

| | | | | |
|---|---|---|---|---|
| 6,450,149 B1 * | 9/2002 | McGee | ................ | F02D 41/403 123/299 |
| 6,453,876 B1 * | 9/2002 | Fukutomi | ............... | F02D 41/20 123/490 |
| 7,000,600 B1 * | 2/2006 | Yamada | .................. | F02D 41/40 123/494 |
| 7,377,262 B2 * | 5/2008 | Oki | ....................... | F02D 35/023 123/435 |
| 8,893,685 B2 * | 11/2014 | Melis | .................... | F02D 41/401 123/478 |

FOREIGN PATENT DOCUMENTS

| | | |
|---|---|---|
| JP | 2006-125371 A | 5/2006 |
| JP | 2008-280911 A | 11/2008 |
| JP | 2011-132898 A | 7/2011 |
| JP | 2011-236770 A | 11/2011 |

* cited by examiner

FIG. 4

| Pdif | Topen | | | |
|---|---|---|---|---|
| | FIRST CYLINDER | SECOND CYLINDER | THIRD CYLINDER | FOURTH CYLINDER |
| 0 | 0.13 | 0.16 | 0.22 | 0.15 |
| 1 | 0.18 | 0.20 | 0.29 | 0.21 |
| 2 | 0.25 | 0.25 | 0.38 | 0.27 |
| 3 | 0.33 | 0.32 | 0.45 | 0.35 |
| 4 | ... | ... | ... | ... |
| ... | | | | |

FIG. 5

| Chaf | Phaf |
|---|---|
| 100 | 1 |
| 95 | 1.14 |
| 90 | 1.21 |
| 85 | 1.35 |
| 80 | ... |
| ... | |

INTERNAL COMBUSTION ENGINE CONTROL SYSTEM WITH INJECTOR VALVE TIMING CONTROL

TECHNICAL FIELD

The present invention relates to an internal combustion engine control system capable of improving accuracy of fuel injection quantities for multiple fuel injections that are for injecting fuel more than once in one cycle per cylinder in a cylinder injection internal combustion engine including an injector that injects fuel directly into a cylinder.

BACKGROUND ART

Recent emissions regulations of each country include more stringent provisions on particulate matter (PM) included in automotive exhaust gas. In particular, while cylinder injection internal combustion engines have an advantage of high output and low fuel consumption over intake-port injection internal combustion engines, the cylinder injection internal combustion engines are disadvantageous in that fuel with large particle sizes adheres to and stays on a piston crown surface and a cylinder bore wall surface and that mixing of fuel and air tends to suffer nonuniformity, leading to a propensity to generate PM.

Existing PM reduction measures for such cylinder injection internal combustion engines include the use of a dual internal combustion engine that includes a cylinder-injecting injector and an intake-port-injecting injector attached on an identical cylinder to allow the use of the intake-port-injecting injector for a travel region with significant PM generation in order to reduce PM. The measures also include the use of a filter attached to capture PM. While these measures are expected to be highly effective at reducing PM, they suffer increased costs due to the addition of new devices.

Approaches to the reduction of PM without adding new devices are, thus, sought after, and one such approach is a technique disclosed in PTL 1 for multiple injection control to perform multiple fuel injections in one cycle. Through this control, the amount of fuel adherence in the cylinder can be reduced and the uniformity of air-fuel mixture can be improved, leading to reduction in PM.

This multiple injection control, however, increases the number of injections without changing the fuel injection quantity, and thus the fuel injection quantity for one injection is smaller than a traditional fuel injection quantity. Such a smaller fuel injection quantity requires improved accuracy of lower fuel flow rates, which have been rarely used traditionally, leading to cost increase for the improvement of injector accuracy.

As a solution to this problem, control techniques described in PTL 2 and PTL 3 can be used. The technique in PTL 2 is to detect valve opening/closing timings of an injector from an injector drive current displacement point for feedback to injector power distribution time control. The technique in PTL 3 is to detect valve opening/closing timings of an injector from a piezoelectric element for feedback to injector power distribution time control.

Through the control techniques in PTL 2 and PTL 3, the valve opening/closing timings of the injector can be detected by using an existing sensor for feedback to the power distribution time control, thereby curbing the cost increase for the injector, achieving the fuel injection with high accuracy, and reducing PM in an inexpensive manner.

CITATION LIST

Patent Literatures

PTL 1: JP 2011-132898 A
PTL 2: JP 2001-280189 A
PTL 3: JP 2003-65178 A

SUMMARY OF INVENTION

Technical Problem

When a required fuel injection quantity is very small for an injection due to reasons such as the multiple injection control, a state in which the injector allows its valve to close before the valve opens completely is caused (hereinafter referred to as half lift) (see FIGS. 6 and 7). The injector allows the valve to open partially in the half lift, which presents difficulty in detecting the valve opening of the injector for the techniques in PTL 2 and PTL 3. Additionally, when the injector valve closes, the valve closing may not be achieved from the complete valve opening (hereinafter referred to as full lift), resulting in small release energy at the valve closing, and thus the valve closing is detected with greater difficulty in comparison with the full lift.

The invention has been achieved in light of the foregoing problems, and it is an object of the invention to provide an internal combustion engine control system capable of highly accurate fuel injection control for the half lift of an injector.

Solution to Problem

To achieve the foregoing object, an internal combustion engine control system according to the invention includes: an injector configured to supply fuel to an internal combustion engine; means for calculating power distribution time for the injector; means for detecting a valve opening of the injector; and means for calculating and storing valve opening delay time, the valve opening delay time being a difference between a power distribution start time and a valve opening detection time, wherein, in a case in which the power distribution time for the injector is not less than a predetermined value, the valve opening delay time is calculated and stored, and in a case in which the power distribution time for the injector is less than the predetermined value, the power distribution time for the injector is controlled based on the valve opening delay time stored in the storing means.

The internal combustion engine control system according to the invention configured as described above stores the valve opening delay time when the power distribution time for the injector is not less than a predetermined value, which is when the injector is at the full lift. This allows the valve opening delay time stored for the full lift to be referenced when the power distribution time for the injector is less than the predetermined value, which is when the injector is at the half lift and when difficulty is involved in the detection of a valve opening timing. In this way, the power distribution time can be controlled with improved accuracy.

Advantageous Effects of Invention

In the internal combustion engine control system according to the invention, a result of the detection of valve opening/closing timings for the full lift, which achieves the complete valve opening, is used for the power distribution time control for the injector in the case of the half lift, in which the injector allows its valve to close before the complete valve opening. In this way, the internal combustion engine control system capable of the highly accurate fuel injection control for the half lift of the injector can be provided. Further problems, configurations, and advantageous effects will become apparent from the description of embodiments provided herein.

BRIEF DESCRIPTION OF DRAWINGS

FIG. 4 is a diagram of a valve opening delay time table.

FIG. 5 is a diagram of a half-lift power distribution time correction table.

DESCRIPTION OF EMBODIMENTS

Figure 1:
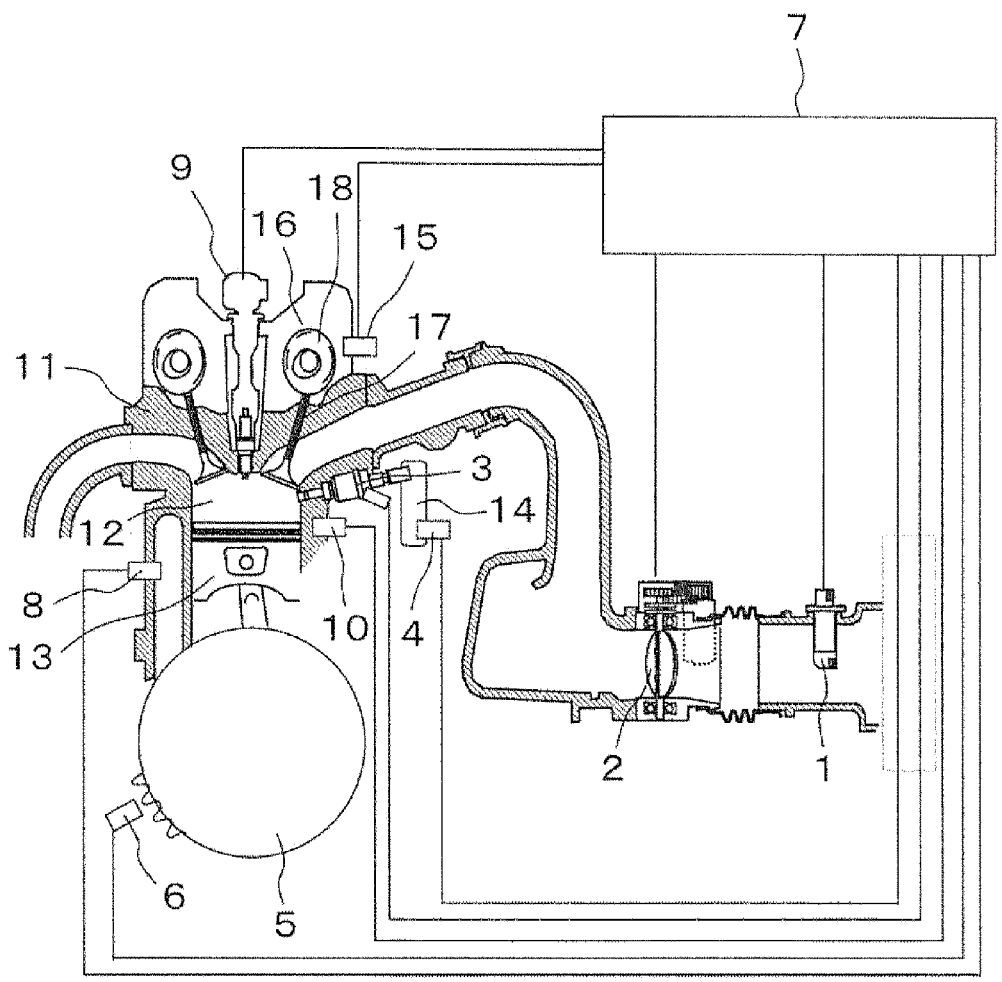
FIG. 1 is a system structure diagram of an embodiment of an internal combustion engine control system according to the invention.

With reference to the drawings, an embodiment of an internal combustion engine control system according to this invention will now be described in detail. FIG. 1 is a system structure diagram of an internal combustion engine control system according to the invention, with a sectional view of a cylinder of an internal combustion engine 11.

An air flow meter 1 to measure the quantity of charging air is placed in a charging passageway of the internal combustion engine 11, and a throttle valve 2 to adjust the charging air quantity is placed downstream from the air flow meter 1. The output from the air flow meter 1 and the output of the opening of the throttle valve 2 are transmitted to an ECU 7. The internal combustion engine 11 includes an injector 3 to inject fuel directly into a cylinder 12. The injector 3 is coupled to a fuel supply passageway 14, so that a high pressure fuel is supplied. A spark plug, which is connected to a spark ignition system 9, is provided in a head of the cylinder 12.

A piston 13 is fitted in the cylinder 12 in a manner that allows up-and-down motion. A crankshaft, which converts the up-and-down motion of the piston 13 to rotational motion, is provided with a crank angle signal plate 5 and a crank angle sensor 6 to detect a rotation angular velocity (engine rpm) and an angular position of the crankshaft. Signals from the crank angle sensor 6 are transmitted to the ECU 7. The internal combustion engine 11 also includes a camshaft to open and close the intake valve 17. The camshaft, which is linked via a timing belt or a metal chain to the crankshaft, rotates in conjunction with the rotation of the crankshaft.

The camshaft is provided with a cam angle signal plate 18 and a cam angle sensor 15 to detect a rotation angular velocity and an angular position of the camshaft. Signals from the cam angle sensor 15 are transmitted to the ECU 7. The intake valve 17 is provided with an intake VTC (valve timing control) 16, which is capable of changing an intake-side camshaft angular phase difference so that open/close timings of the intake valve 17 can be changed. The intake VTC 16 is controlled through signals from the ECU (engine control unit) 7.

As described below, the control system includes other sensors, which all transmit signals to the ECU 7. A fuel pressure sensor 4 is a sensor to measure a pressure in the fuel supply passageway 14 to the injector 3. A coolant temperature sensor 8, which is attached on a coolant passageway of the internal combustion engine 11, is a sensor to measure a coolant temperature of the engine. A valve opening detection sensor 10 is a sensor to detect a valve opening timing of the injector 3. The valve opening detection sensor 10 can be also used as a knock sensor to detect knocking.

The internal combustion engine 11 according to the embodiment allows the throttle valve 2 to adjust the charging quantity of the charging air. The charging quantity of the charging air adjusted by the throttle valve 2 is measured by the air flow meter 1, which in turn transmits a corresponding signal to the ECU 7. The charging air then passes the intake valve 17 into the cylinder 12 of the internal combustion engine to form an air-fuel mixture with fuel that has been injected by the injector 3. Power is distributed to the injector 3 in response to a signal from the ECU 7, so that the injector 3 injects the fuel under valve opening/closing control.

The air-fuel mixture formed with the fuel and the charging air in the cylinder 12 is ignited by the spark ignition system 9. The spark ignition system 9 is under ignition control through a signal from the ECU 7. The ignited air-fuel mixture is burned to expand, thereby pressing down the piston 13. The piston 13 is linked to an output shaft (crankshaft), which rotates as the piston 13 is pressed down to output energy.

Figure 3:
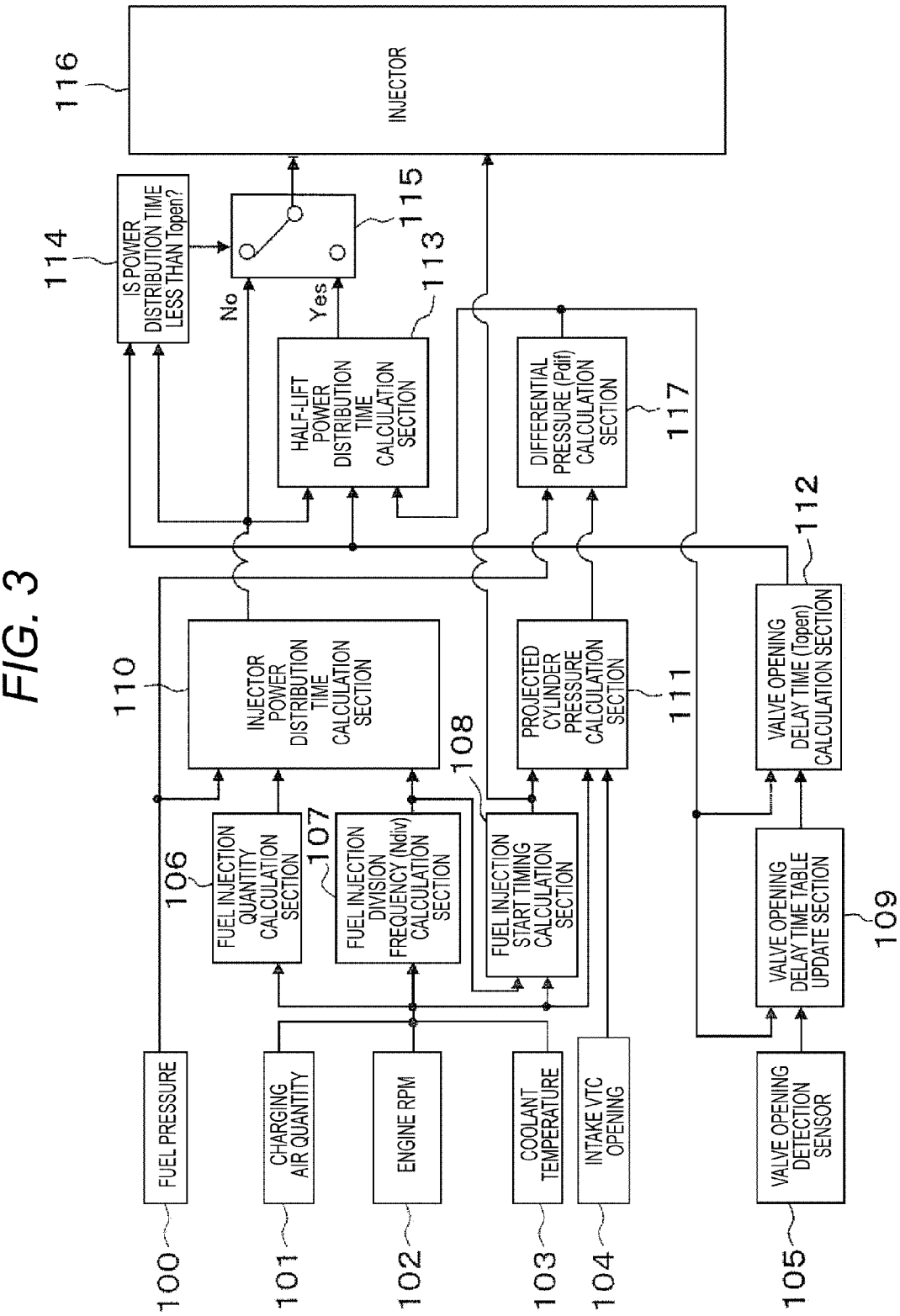
FIG. 3 is a block diagram for the fuel injection by the internal combustion engine control system illustrated in FIG. 1.

FIG. 3 is a block diagram of a fuel injection section in the internal combustion engine control system according to the embodiment. Blocks in FIG. 3 receive a fuel pressure 100 detected by the fuel pressure sensor 4, a charging air quantity 101 detected by the air flow meter 1, an engine rpm 102 detected by the crank angle sensor 6, a coolant temperature 103 detected by the coolant temperature sensor 8, an intake VTC opening 104 detected by the intake VTC 16, and a signal detected by the valve opening detection sensor 105 to perform various processing such as calculating, storing, determining, and switching.

A fuel injection quantity calculation section 106 calculates a fuel injection quantity to be injected by the injector 3 (116) based on the charging air quantity 101, the engine rpm 102, and the coolant temperature 103. A fuel injection division frequency calculation section 107 calculates a division frequency of the fuel injection, which is a frequency of dividing fuel to be injected to each cylinder per cycle, based on the charging air quantity 101, the engine rpm 102, and the coolant temperature 103. A fuel injection start timing calculation section 108 calculates a fuel injection start timing based on the charging air quantity 101, the engine rpm 102, the coolant temperature 103, and the division frequency of the fuel injection. A valve opening delay time table update section 109 receives an output of the valve opening detection sensor 105 and stores half-lift power distribution time correction (Phaf) data in relation to a half-lift index (Chaf) illustrated in FIG. 5.

An injector power distribution time calculation section 110 calculates power distribution time for the injector 3 based on the fuel pressure 100, the fuel injection quantity calculated by the fuel injection quantity calculation section 106, and the division frequency of the fuel injection calculated by the fuel injection division frequency calculation section 107. The injector power distribution time calculation section 110 calculates the power distribution time for the injector 3 based on a ratio of a reference fuel injection quantity that is stored in advance based on valve opening delay time to be described hereinafter to a required fuel injection quantity for a half lift (when the power distribution time is less than a predetermined value) to be described hereinafter.

A projected cylinder pressure calculation section 111 calculates a projected cylinder pressure based on the start timing calculated by the fuel injection start timing calculation section 108, the charging air quantity 101, the engine rpm 102, the coolant temperature 103, and the intake VTC opening 104. A valve opening delay time calculation section 112 references a valve opening delay time table illustrated in FIG. 4 to calculate valve opening delay time (Topen) based on a differential pressure (Pdif) calculated by a differential pressure detection section 117 to be described hereinafter. A half-lift power distribution time calculation section 113 calculates half-lift power distribution time based on the power distribution time calculated by the injector power distribution time calculation section 110, the valve opening delay time calculated by the valve opening delay time calculation section 112, and the differential pressure (Pdif) calculated by the differential pressure detection section 117 to be described hereinafter for a half-lift to be described hereinafter.

A power distribution time determination section 114 determines whether the injector power distribution time calculated by the injector power distribution time calculation section 110 is less than, or not less than, the valve opening delay time (Topen). Switching means 115 switches between the normal power distribution time calculated by the injector power distribution time calculation section 110 and the half-lift power distribution time calculated by the half-lift power distribution time calculation section 113 for the injector 116 in accordance with a result of the determination by the power distribution time determination section 114. The differential pressure detection section 117 calculates the differential pressure (Pdif) based on the fuel pressure 100 and the projected cylinder pressure calculated by the projected cylinder pressure calculation section 111.

Figure 2:
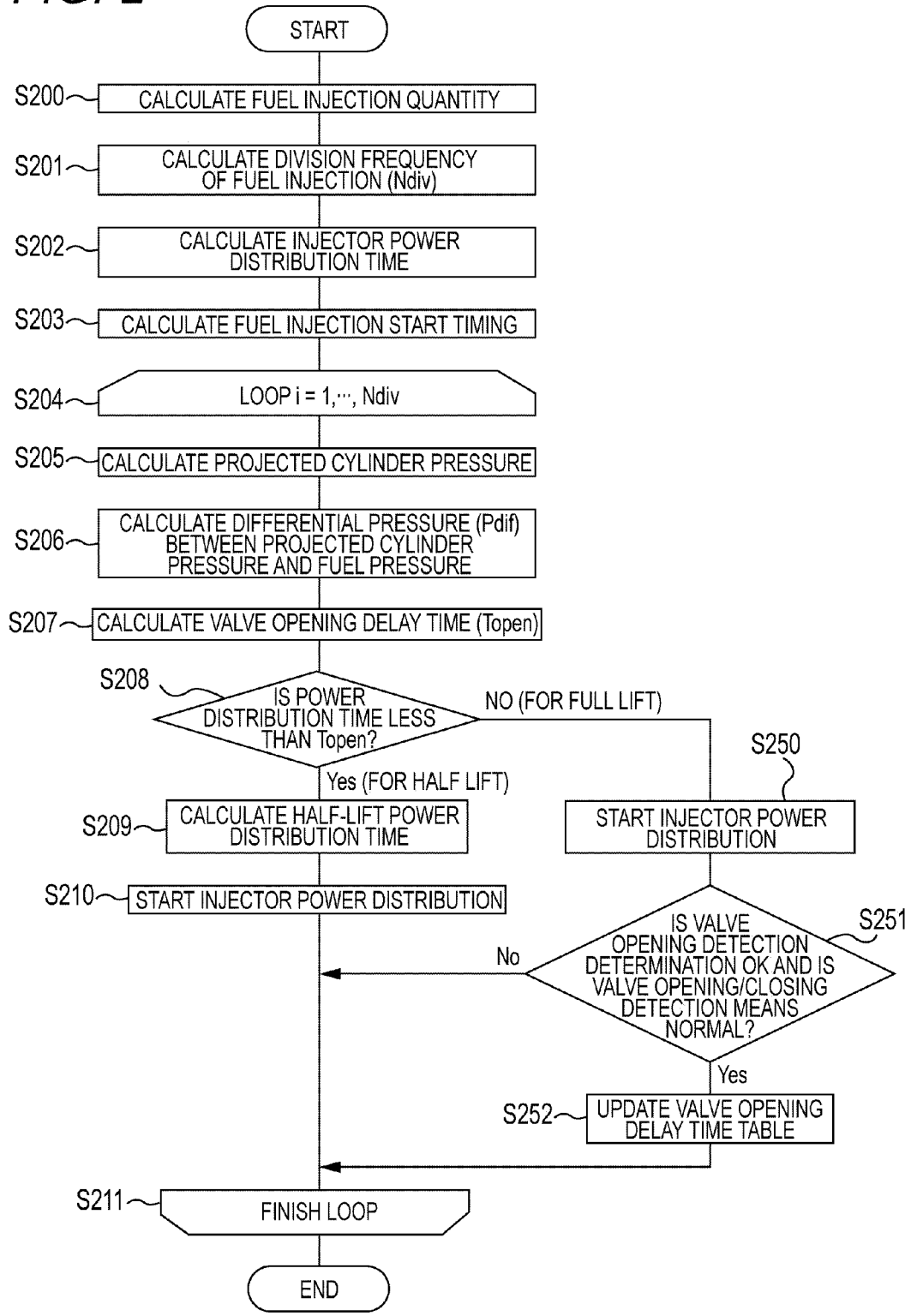
FIG. 2 is a flowchart of an operation of fuel injection with the internal combustion engine control system illustrated in FIG. 1.

An operation of the internal combustion engine control system according to the example will now be described with reference to a flowchart illustrated in FIG. 2 and the block diagram illustrated in FIG. 3. FIG. 2 is a flowchart for fuel injection for one cylinder in one cycle. In step 200 (S200), the fuel injection quantity is calculated. The fuel injection quantity is calculated based on the charging air quantity 101, the engine rpm 102, and the coolant temperature 103 (the fuel injection quantity calculation section 106 in FIG. 3).

In step 201(S201), the division frequency of the fuel injection (Ndiv) is calculated. The division frequency of the fuel injection is calculated based on the charging air quantity 101, the engine rpm 102, and the coolant temperature 103 (the fuel injection division frequency calculation section 107 in FIG. 3). The division frequency of the fuel injection is a frequency of dividing fuel to be injected to each cylinder per cycle. The frequency is normally one for gasoline engines, although it is more than one for travel under low coolant temperatures and during acceleration with increased PM emissions.

In step 202(S202), the injector power distribution time is calculated. The injector power distribution time is calculated based on the fuel injection quantity calculated by the fuel injection quantity calculation section 106, the fuel pressure 100, and the division frequency of the fuel injection calculated by the fuel injection division frequency calculation section 107 (the injector power distribution time calculation section 110 in FIG. 3). Here, if the division frequency of the fuel injection calculated by the fuel injection division frequency calculation section 107 is three, then three patterns of the injector power distribution time are calculated.

In step 203 (S203), the fuel injection start timing is calculated. The fuel injection start timing is calculated based on the charging air quantity 101, the engine rpm 102, the coolant temperature 103, and the division frequency of the fuel injection calculated by the fuel injection division frequency calculation section 107 (the fuel injection start timing calculation section 108 in FIG. 3). Here, if the division frequency of the fuel injection calculated by the fuel injection division frequency calculation section 107 is three, then three fuel injection start timings are calculated. Step 204 (S204) indicates the start of processing to repeat injecting the fuel injection the number of times that equals the division frequency of the fuel injection. Here, if the fuel injection has been injected the number of times that equals the division frequency of the fuel injection (Ndiv), the processing is finished.

In step 205 (S205), the projected cylinder pressure is calculated. The projected cylinder pressure is calculated by projecting a cylinder pressure at a point in time of the start of the fuel injection. The cylinder pressure refers to the pressure inside the cylinder 12 in FIG. 1. The projected cylinder pressure is calculated based on the start timing calculated by the fuel injection start timing calculation section 108, the charging air quantity 101, the engine rpm 102, the coolant temperature 103, and the intake VTC opening 104 (the projected cylinder pressure calculation section 111 in FIG. 3). Note that the cylinder pressure in the cylinder 12 of the internal combustion engine 11 may be measured directly for use in control to be described below, in place of the projecting of a cylinder pressure by the projected cylinder pressure calculation section 111.

In step 206 (S206), the differential pressure (Pdif) between the projected cylinder pressure calculated by the projected cylinder pressure calculation section 111 and the fuel pressure 100 is calculated (the differential pressure calculation section 117 in FIG. 3). In step 207 (S207), the valve opening delay time table in FIG. 4 is referenced (the valve opening delay time table update section 109) to calculate the valve opening delay time (Topen) based on the differential pressure (Pdif) calculated by the differential pressure detection section 117 (the valve opening delay time calculation section 112 in FIG. 3). Note that the cylinder pressure in the cylinder 12 may be measured directly to calculate the differential pressure, in place of using the projected cylinder pressure.

Although the valve opening delay time table is calculated empirically and stored in the ECU 7 in advance, values of the valve opening delay time (Topen) vary among individual injectors due to their variations and thus the values are updated sequentially for each cylinder in step 252 (S252) to be described hereinafter (the valve opening delay time table update section 109 in FIG. 3).

In step 208 (S208), it is determined whether the injector power distribution time calculated in (S202) is less than the valve opening delay time (Topen) (the power distribution time determination section 114 in FIG. 3). If the injector power distribution time is less than the valve opening delay time (Topen), it is decided that the injector will achieve a half lift, in which the valve opens partially. The switching means 115 shifts the processing to half-lift processing (S209) to calculate the half-lift power distribution time. If the injector power distribution time is not less than the valve opening delay time (Topen), it is decided that the injector will achieve a full lift, in which the valve opens completely. The switching means 115 shifts the processing to full-lift processing (S250) to perform injector power distribution start processing (the power distribution time determination section 114 in FIG. 3).

In an aspect different from this example, the control may be that, if, in step 208 (S208), the power distribution time for the injector is less than a predetermined value, and thus it is decided that the half lift will be achieved, the fuel injection from the injector 3 (116) is disabled, in place of the half-lift processing (S209) and (S210). By disabling the fuel injection from the injector for the half lift in which the power distribution time for the injector is less than a predetermined value as described above, fuel injection accuracy can be maintained.

Additionally, the calculation of the half-lift power distribution time in step 209 (S209) may be configured in such a manner that the power distribution time for the injector is calculated based on a ratio of the reference fuel injection quantity that is stored in advance based on the valve opening delay time to the required fuel injection quantity. With such a configuration, in which the power distribution time for the half lift is calculated with the ratio of the required fuel injection quantity for the half lift to the reference fuel injection quantity for the full lift, deterioration of the power distribution time accuracy, which results from a nonlinear relationship between the required fuel injection quantity for the half lift and the power distribution time, can be prevented.

In step 250 (S250), the ECU allows the power to be distributed to the injector to inject fuel based on the fuel injection start timing calculated by the fuel injection start timing calculation section 108 in (S203) and the injector power distribution time calculated by the injector power distribution time calculation section 110 in (S202). In step 251 (S251), when the injector has achieved the complete valve opening after the start of the power distribution to the injector, it is determined whether or not the valve opening detection sensor 105 has detected the valve opening of the injector. If a signal can be detected within predetermined time and if self-diagnosis has determined a normal state with no failure in the valve opening detection sensor 105 due to reasons such as breaking of wire and short circuit, the flowchart proceeds to (S252), or otherwise to (S211). Additionally, in step 251 (S251), if the valve opening detection sensor 105 has failed, the storing of the valve opening delay time is disabled. With such a configuration, when the valve opening detection means has failed, inadvertent storing of the valve opening delay time is prevented. Thus, the fuel injection accuracy can be maintained for the half lift.

In step 252 (S252), a difference between the injector power distribution start timing (S250) and the valve opening detection timing detected in (S251) is calculated as the valve opening delay time (Topen). The differential pressure (Pdif) calculated in (S206) is then referenced to update the valve opening delay time (Topen) in the valve opening delay time table (FIG. 4) (the valve opening delay time table update section 109 in FIG. 3). In step 211 (S211), the flowchart reverts to the beginning (S204) of repeated processing.

Figure 6:
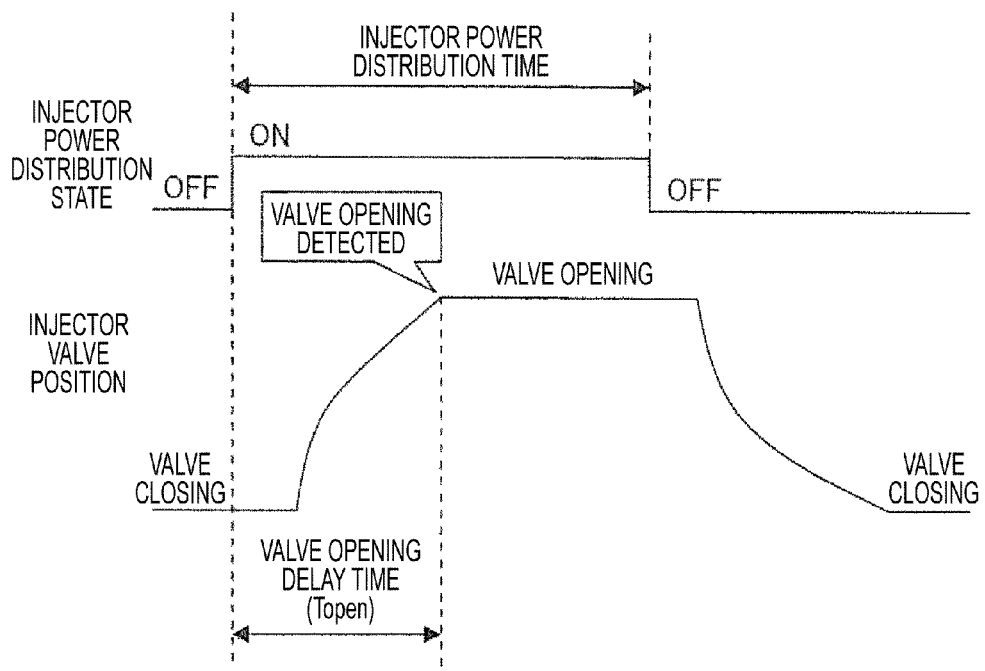
FIG. 6 is a time chart of injector behavior for a full lift.
Figure 7:
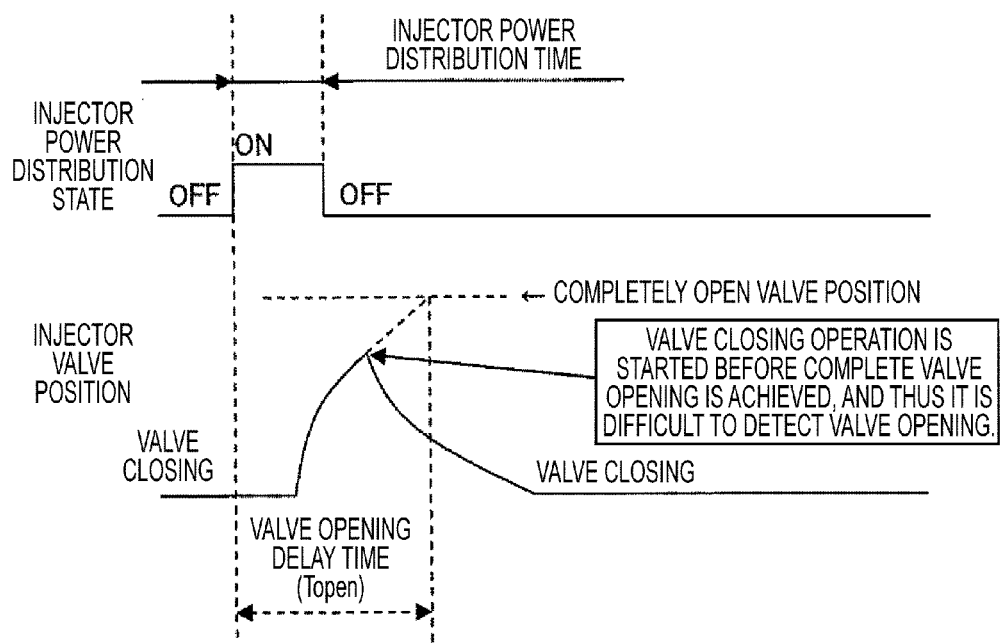
FIG. 7 is a time chart of injector behavior for a half lift.

With reference to FIGS. 6 and 7, the valve opening delay time (Topen) will now be illustrated. FIG. 6 is a graph of injector behavior for the full lift, and FIG. 7 is a graph of injector behavior for the half lift. The power distribution states of the injector at OFF and ON set the length of the power distribution time. The valve position of the injector refers to the valve opening and the valve closing. When the power distribution state has achieved ON, the valve starts to open gradually after a delay until it reaches a completely open valve position at the full lift. When the power distribution has achieved OFF, the valve starts to close gradually after a delay. In contrast, if the power distribution time is short enough to be less than the valve opening delay time (Topen), the valve position does not reach the completely open valve position. The power distribution time achieves OFF with a small opening of the valve, and the valve closes gradually. As described above, the opening of the valve (a lift level) is insufficient at the half lift.

The case in which it has been determined that the power distribution time is less than the valve opening delay time (Topen) in step 208 (S208) will now be described. In step 209 (S209), the half-lift power distribution time is calculated (the half-lift power distribution time calculation section 113 in FIG. 3). Here, the half-lift index is calculated with the injector power distribution time and the valve opening delay time (Topen) using an expression (1) as described below.

$$\text{Half-lift index (Chaf) [\%]} = \text{injector power distribution time/valve opening delay time (Topen)} \quad (1)$$

As the percentage of the half-lift index (Chaf) increases, the valve opening of the injector increases. With the half-lift index (Chaf) at 100%, the complete valve opening (the full lift) is achieved. As the percentage decreases, the lift level of the injector decreases, with a fuel flow rate also decreasing in proportion to the lift level. Thus, if the injector is controlled for the half lift using the injector power distribution time calculated with the full lift of the injector assumed in step 202 (S202), a resulting fuel injection quantity will be smaller than an actual quantity. Because of this, the injector power distribution time needs to be increased for a smaller half-lift index (Chaf).

Hence, the half-lift injector power distribution time is calculated using an expression (2) as described below. The half-lift power distribution time correction (Phaf) is calculated with the half-lift power distribution time correction table in FIG. 5. Note that the half-lift power distribution time correction table is calculated empirically and stored in the ECU 7 in advance.

$$\text{Half-lift injector power distribution time} = \text{injector power distribution time} \times \text{half-lift power distribution time correction (Phaf)} \quad (2)$$

In step 210 (S210), the ECU 7 allows the power to be distributed to the injector based on the fuel injection start timing calculated in (S203) and the half-lift injector power distribution time calculated in (S209) to inject the fuel. In step 211 (S211), the flowchart reverts to the beginning (S204) of the repeated processing.

The internal combustion engine control system according to the embodiment stores the valve opening delay time based on the differential pressure between the fuel pressure 100 detected by the fuel pressure sensor 4 and the projected cylinder pressure calculated by the projected cylinder pressure calculation section 111 when the power distribution time for the injector is not less than a predetermined value. This allows the half-lift power distribution time calculation section 113 to calculate the valve opening delay time based on the differential pressure stored in the storing means when the power distribution time for the injector is less than the predetermined value. With such a configuration, the valve opening delay time corresponding to the differential pressure between the fuel pressure and the cylinder pressure can be stored during the full lift of the injector, while, in the half lift when the detection of the valve opening timing is difficult, the stored full-lift valve opening delay time corresponding to the differential pressure between the fuel pressure and the cylinder pressure can be referenced. The valve opening delay time is dependent on the differential pressure between the fuel pressure and the cylinder pressure, and thus, through this control, the half-lift power distribution time can be controlled with further improved accuracy in comparison with the control described above.

Although the embodiment of the invention has been described in detail, the invention is not limited thereto. Various design modifications are possible without departing from the spirit of the invention described in the claims. For example, the foregoing embodiment has been described in detail to facilitate understanding of the invention, and thus, the embodiment is not limited to those that include the entire configuration described above. Additionally, it is possible to replace a part of a configuration of an embodiment with a configuration of another embodiment. It is also possible to add, to a configuration of an embodiment, a configuration of another embodiment. It is further possible to add another configuration to a part of a configuration of each embodiment, delete a part of a configuration of each embodiment, and replace a part of a configuration of each embodiment with another configuration.

For example, an example has been described in which the valve opening detection sensor is used to detect the valve opening state of the injector to perform control, but the valve closing detection sensor may be of course used to perform the control.

REFERENCE SIGNS LIST 1 air flow meter
2 throttle valve
3 injector
4 fuel pressure sensor
5 crank angle signal plate
6 crank angle sensor
7 ECU (engine control unit)
8 coolant temperature sensor
9 spark ignition system
10 valve opening detection sensor
11 internal combustion engine
12 cylinder
13 piston
14 fuel supply passageway
15 cam angle sensor
16 intake VTC
17 intake valve
18 cam angle signal plate
100 fuel pressure
101 charging air quantity
102 engine rpm
103 coolant temperature
104 intake VTC opening
105 valve opening detection sensor
106 fuel injection quantity calculation section
107 fuel injection division frequency calculation section
108 fuel injection start timing calculation section
109 valve opening delay time table update section
110 injector power distribution time calculation section
111 projected cylinder pressure calculation section
112 valve opening delay time calculation section
113 half-lift power distribution time calculation section
114 power distribution time determination section
115 switching means
116 injector
117 differential pressure calculation section

The invention claimed is:

1. An internal combustion engine control system, comprising: an injector configured to supply fuel to an internal combustion engine; means for calculating power distribution time for the injector; means for detecting a valve opening of the injector; and means for calculating and storing valve opening delay time, the valve opening delay time being a difference between a power distribution start time and a valve opening detection time, wherein, in a case in which the power distribution time for the injector is not less than a predetermined value, the valve opening delay time is calculated and stored, and in a case in which the power distribution time for the injector is less than the predetermined value, the power distribution time for the injector is controlled based on the valve opening delay time stored in the storing means.

2. The internal combustion engine control system according to claim 1, further comprising: pressure detection means for detecting a fuel pressure of the injector; means for one of detecting and projecting of a cylinder pressure of the internal combustion engine; and means for calculating and storing a differential pressure between the fuel pressure and the cylinder pressure, wherein the valve opening delay time is calculated and stored based on the differential pressure.

3. The internal combustion engine control system according to claim 1, wherein, in the case in which the power distribution time for the injector is less than the predetermined value, the power distribution time for the injector is calculated based on a ratio of a reference fuel injection quantity stored in advance based on the valve opening delay time to a required fuel injection quantity.

4. The internal combustion engine control system according to claim 1, wherein, in the case in which the power distribution time for the injector is less than the predetermined value, fuel injection from the injector is disabled.

5. The internal combustion engine control system according to claim 1, wherein, in a case of failure of the valve opening detection means, the storing of the valve opening delay time is disabled.

* * * * *